(12) United States Patent
Zwettler et al.

(10) Patent No.: US 6,918,553 B2
(45) Date of Patent: Jul. 19, 2005

(54) CONTROLLING WINDING TENSION TO REDUCE TAPE PACK STRESS

(75) Inventors: Christopher J. Zwettler, Lake Elmo, MN (US); Douglas W. Johnson, St. Paul, MN (US)

(73) Assignee: Imation Corp., Oakdale, MN (US)

(*) Notice: Subject to any disclaimer, the term of this patent is extended or adjusted under 35 U.S.C. 154(b) by 75 days.

(21) Appl. No.: 10/358,732

(22) Filed: Feb. 5, 2003

(65) Prior Publication Data

US 2004/0149846 A1 Aug. 5, 2004

(51) Int. Cl.⁷ .............................................. B65H 59/38
(52) U.S. Cl. ...................................... 242/334.6; 360/71
(58) Field of Search ...................... 242/334.6; 360/71, 360/85, 93, 95

(56) References Cited

U.S. PATENT DOCUMENTS

| | | |
|---|---|---|
| 4,696,439 A | 9/1987 | Sukigara et al. |
| 5,012,989 A | 5/1991 | Whyte, Jr. et al. |
| 6,480,357 B1 | 11/2002 | Rambosek |
| 2002/0166913 A1 | 11/2002 | Ridl et al. |

FOREIGN PATENT DOCUMENTS

EP          0 854 480 A1       7/1998

OTHER PUBLICATIONS

Mathur et al., "Controller Development for a Prototype High-Speed Low-Tension Tape Transport," *IEEE Transactions on Control Systems Technology*, vol. 6, No. 4, pp. 534–542, Jul., 1998.

*Primary Examiner*—John Q. Nguyen
(74) *Attorney, Agent, or Firm*—Eric D. Levinson

(57) ABSTRACT

In general, the invention is directed to techniques for reducing deformation of tape in data tape cartridges during storage to promote dimensional stability and increased tape longevity. The techniques involve controlling the winding tension applied to a tape during a final winding pass prior to unloading a data tape cartridge containing the tape from a drive. Excessive winding tensions can produce strain and compression on a tape pack, causing the tape to deform over time. Applications of reduced winding tension during the final pass provide reduced tape pack tension during periods in which the data tape cartridge is not used.

18 Claims, 9 Drawing Sheets

CONTROLLING WINDING TENSION TO REDUCE TAPE PACK STRESS

TECHNICAL FIELD

The invention relates to the field of data storage and, more particularly, to data storage tape media.

BACKGROUND

Data storage tape, such as magnetic tape, is used in a variety of data storage applications ranging from desktop computer backup to high volume archival for large data processing centers. In addition to the demand for increased data storage density, the design of data storage tape typically involves efforts to enhance tape longevity and durability. Dimensional stability, in particular, is a challenge in the design of data storage tape, especially as tape substrate thicknesses decrease.

Changes in the longitudinal or transverse dimensions of a data storage tape can adversely affect the ability to read the tape, and limit tape longevity. For example, some servo tracking and read/write techniques may be impacted by changes in the overall dimensions of the data storage tape, as well as dimensional variation along the length of the tape. Dimensional stability may be a function of the materials that form the tape, environmental conditions, and operating conditions during use.

SUMMARY

In general, the invention is directed to techniques for reducing deformation of tape in data tape cartridges during storage to promote dimensional stability and increase tape longevity. The techniques involve controlling the winding tension applied to a tape during a final winding pass prior to unloading a data tape cartridge containing the tape from a drive. Application of reduced winding tension during the final winding pass can minimize elastic strain, and especially strain in the transverse direction of the tape. This technique may be applied to single or dual reel data cartridges.

Excessive winding tensions can produce strain and compression on a tape pack, causing the tape to deform over time. High tension can result in longitudinal stretching of the tape, sometimes referred to as "longitudinal creep." In addition, stretching typically results in a narrowing of the transverse width of the tape, sometimes referred to as "latitudinal creep."

Another form of deformation caused by high tension is "telescoping," in which one edge of the magnetic tape lengthens relative to the opposite edge. "Telescoping" may result from compressive forces exerted on a generally rigid hub that carries the tape. In particular, the compressive forces may cause nonuniformities in the generally cylindrical shape of some less rigid hubs.

The compressive forces also may produce a "spreading" effect that tends to thin and spread tape within the tape pack. Tape closer to the inner radius of the tape pack may exhibit more spreading of the tape at the outer radius, causing additional nonuniformities. High tension winding of the tape may increase the compressive force.

Deformation such as longitudinal creep, latitudinal creep, telescoping, and spreading can disrupt the head-tape interface and undermine servo tracking in a tape drive. In particular, deformation may result in difficulty in positioning the head at the appropriate track of the tape, adversely affecting the overall operation and read/write performance of the drive. Nonuniformity in the tape width is especially problematic when using multi-channel heads, because the read/write elements generally have a fixed pitch and do not align correctly with data tracks when the track pitch changes. Data cannot be read from the tape accurately when the read/write elements are not sufficiently aligned with the data tracks.

In one embodiment, the invention provides a method comprising winding a tape about a hub in a data tape cartridge with a first winding tension during use of the data tape cartridge within a tape drive, and winding the tape about the hub with a second winding tension less than the first winding tension during a final winding pass prior to unloading the tape from the tape drive.

In another embodiment, the invention provides a tape drive comprising a motor that drives a hub in a data tape cartridge to wind a tape about the hub, and a controller that controls the motor to wind the tape about the hub with a first winding tension during use of the data tape cartridge within the tape drive, and with a second winding tension less than the first winding tension during a final winding pass prior to unloading the tape from the tape drive.

In an added embodiment, the invention provides a data tape cartridge comprising a hub and tape wound about the hub, wherein the tape exhibits a tension of less than approximately 3 ounces.

The invention may provide one or more advantages. For example, the techniques described herein may produce reduced stresses on a tape pack prior to storage of the data tape cartridge for an extended period of time. In other words, by applying a reduced winding tension during the final winding pass prior to unloading the tape cartridge from a drive, the tape cartridge can be stored with a reduced tension, resulting in reduced strain and compression. In this manner, the tape may be less likely to undergo significant deformation during storage, promoting dimensional stability and operational longevity, and better preserving the head-tape interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
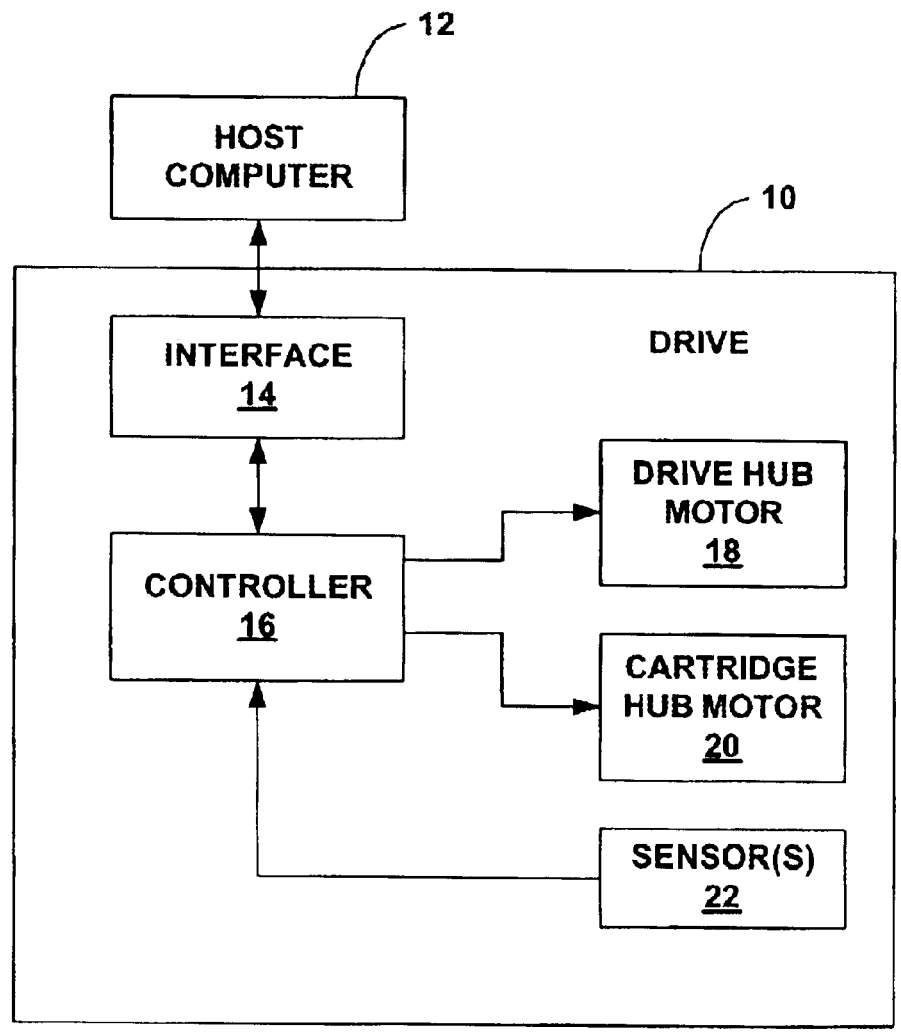
FIG. 1 is a block diagram illustrating a data tape cartridge drive implementing a technique for controlling winding tension to reduce tape pack stress.

FIG. 1 is a block diagram illustrating a data tape cartridge drive 10. As shown in FIG. 1, the tape drive 10 drawing includes an interface 14 for communication with a host computer 12, a controller 16, a drive hub motor 18, a cartridge hub motor 20, and one or more sensors 22.

In general, data tape cartridge drive 10 exchanges data and read-write commands with host computer 12, and may be mounted with the host computer or provided as a stand-alone drive coupled to the host computer. Data tape cartridge drive 10 may operate, for example, with data tape cartridges carrying magnetic or optical tape. Interface 14 may conform to any variety of interface standards, e.g., SCSI, USB, PCI, or the like.

In accordance with the invention, data tape cartridge drive 10 implements tape winding techniques designed to reduce deformation of tape in data tape cartridges during storage to thereby promote dimensional stability and increase tape longevity. The techniques may involve controlling the winding tension applied to a tape during a final winding pass prior to unloading a data tape cartridge containing the tape from data tape cartridge drive 10. In particular, during the final winding pass before the cartridge is unloaded, data tape cartridge drive 10 may wind the tape with a reduced tension relative to a normal range of tension used when winding and unwinding the tape for read and write operations.

Controller 16 may be configured to control drive hub motor 18 and cartridge hub motor 20 to achieve desired winding tensions during read/write operations and during the final winding pass. For example, controller 16 may control the speed of motors 18, 20 in a coordinated manner to control the winding tension of the data tape.

In some embodiments, one or more sensors 22 may provide feedback information to controller 16 regarding the radius of the data tape wound around the drive hub motor 18 or cartridge hub motor 20, the length of tape that has passed the sensor, the compression tension, or possibly the winding tension itself Controller 16 may selectively control motors 18, 20 in response to the feedback information to provide a profiled winding tension that varies as the tape radius about the cartridge hub changes.

Figure 2:
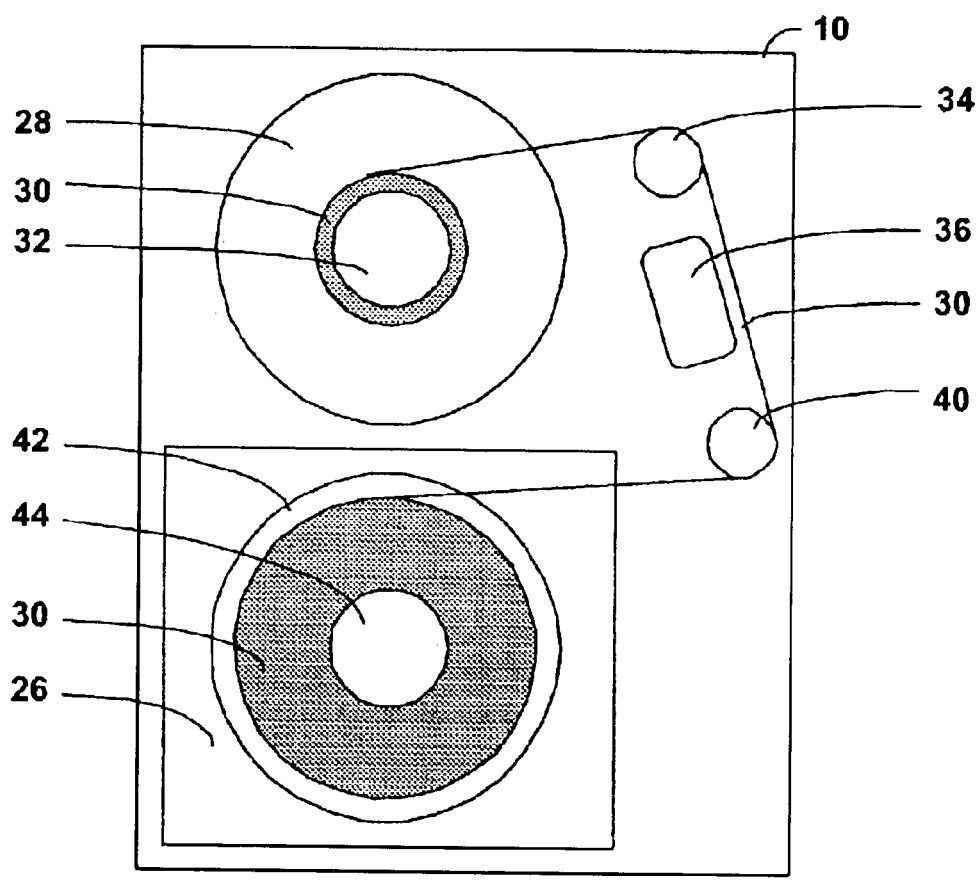
FIG. 2 is a block diagram illustrating interaction of a data tape cartridge drive and a data tape cartridge.

FIG. 2 is a block diagram illustrating a data tape cartridge drive 10 and a data tape cartridge 26 loaded into the drive. Data tape cartridge drive 10 may include a take-up reel assembly 28, a drive hub 32 to receive tape 30 from data tape cartridge 26, a set of precision rollers 34 and 40 to guide the tape within drive 10, and a data read/write head 36 on a positioning actuator.

As shown in FIG. 2, a length of tape 30 travels within drive 10 to be read and written by data read/write 36 head. Drive hub motor 18 (not shown in FIG. 2) is coupled to rotate drive hub 32. Drive hub motor 18 is controlled by controller 16 and turns drive hub 32 to wind and unwind tape 30 from drive hub 32 for read and write operations. Hub 18 may be formed, for example, from metal or plastic.

Data tape cartridge drive 10 includes a loading door or slot to receive data tape cartridge 26. As further shown in FIG. 2, data tape cartridge 26 include a cartridge reel 42, a cartridge hub 44, and tape 30 wrapped around the cartridge hub. Cartridge hub motor 20 (not shown in FIG. 2) is coupled to rotate cartridge hub 44. Cartridge hub motor 20 is controlled by controller 16 and turns cartridge hub 44 to wind and unwind tape 30 from drive hub 32 for read and write operations.

Although data tape cartridge 26 has a single hub 44 in the example of FIG. 2, the invention may be applicable to other cartridge configurations including cartridges having multiple hubs and reels, as well as belt-driven cartridges. When cartridge 26 includes a single hub 44, a leading edge of tape 30 may be equipped with a leader element for engagement by drive 10.

In operation, data tape cartridge drive 10 controls motor 20 to drive a cartridge hub 44 to wind and unwind tape 30 relative to cartridge hub, and controls motor 18 to wind and unwind tape 46 relative to the drive hub 32. In particular, controller 16 of data tape cartridge drive 10 controls motors 18, 20 to produce a first winding tension during use of the data tape cartridge 26 within the tape drive 10 for read/write operations, and a second winding tension less than the first winding tension during a final winding pass prior to unloading the tape cartridge 26 from the tape drive 10.

The final winding pass refers to the winding of the entire length of tape 30 about cartridge hub 44 and unwinding of the entire length of tape from drive hub 32 for unloading of the tape cartridge 26 from drive 10, e.g., in response to an ejection or unloading command. When tape cartridge 26 is unloaded from drive 10, the cartridge may be stored for an extended and indefinite period of time. For example, cartridge 10 may be stored in a slot in a tape library and left unused for days, weeks or months. During that extended period of time, tape 30 may be susceptible to deformation, especially when drive 10 executes the final winding pass with relatively high winding tensions.

Again, high winding tension can result in longitudinal stretching of the tape, sometimes referred to as "longitudinal creep," as well as a narrowing of the transverse width of the tape, sometimes referred to as "latitudinal creep." In addition to creep, high winding tension may produce compressive forces that cause the tape to suffer from "telescoping" and "spreading."

High winding tension also may have an effect on the shape uniformity of compliant hubs that support the tape. Hub shape uniformity can contribute to tape deformation. For example, one end of the hub may be compressed relative to an opposite end of the hub, producing different hub radii on opposite sides of the tape. Deformation such as longitudinal creep, latitudinal creep, telescoping, and spreading can disrupt the head-tape interface and undermine servo tracking in a tape drive.

Accordingly, to reduce susceptibility of the tape to deformation and thereby preserve the integrity of the head-tape interface, drive 10 may be configured to apply a reduced winding tension during the final winding pass. The reduced winding tension is substantially less than the winding tension applied during ordinary read/write operation of drive 10 and cartridge 26. The winding tension may extend substantially longitudinally along the length of tape 30.

In one embodiment, for example, tape drive 10 may apply a first winding tension in a range of greater than or equal to approximately 3 ounces to equal to approximately 5 ounces during ordinary read/write operation, and a second winding tension in the range of approximately 0.5 ounces to less than approximately 3 ounces during the final winding pass. In some embodiments, the second winding tension may be less than approximately 3 ounces, preferably less than or equal to approximately 2 ounces, and more preferably less than or equal to approximately 1 ounce. Accordingly, a reduced winding tension may produce a tape cartridge having a tape that exhibits a longitudinal tension of less than approximately 3 ounces, preferably less than approximately 2 ounces, and more preferably less than approximately 1 ounce.

Controller 16 of drive 10 may control the winding tension by controlling motors 18, 20. For example, controller 16 may control drive current or other drive parameters such as pulse width, duty cycle, frequency or the like as a function of the desired winding tension. Controller 16 may control the winding tension in an open loop manner. Alternatively, controller 16 may employ one or more sensors 22, as illustrated in FIG. 1, and control the winding tension in response to feedback signals provided by the sensors.

Controller 16 may take the form of a microprocessor, microcontroller, FPGA, ASIC or other integrated or discrete logic circuitry, and may further include current drive circuitry to drive motors 18, 20. Controller 16 may be programmed to apply different winding tension profiles for different types of tape cartridges, including tape cartridges with different storage capacities and tape pack sizes.

Drive 10 may include one or more sensors 22 that sense a radius of the tape 30 wound about a hub (32 or 44), and a controller 16 that controls the winding tension on the final pass as a function of the sensed radius. Sensors 22 may be positioned within drive 10, for example, to sense the radius of tape 30 wound about drive hub 32 or cartridge hub 44, i.e., from the hub outer diameter to the outermost layer of the tape. As an alternative, sensors 22 may sense a length of tape wound about drive hub 32 or cartridge hub 44 as an indication of the resulting radius of the tape on the respective hub.

In either case, the sensed radius permits the use of winding tension profiles that vary the winding tension during the course of the final pass based on radius, instead of applying a constant, albeit reduced, winding tension during the final pass. Varied winding tension may be desirable in light of the different compressive forces exerted on different layers of tape 30 as the tape is wound about cartridge hub 44. In particular, greater compressive forces may be exerted on the inner layers of tape 30 relative to outer layers of the tape. Accordingly, the sensed radius may be used as an indication of varying compressive force, and therefore serve as the basis for variation in the winding tension profile applied to tape 30 during the final winding pass. In this sense, controller 16 may be configured to control the second winding tension during the final winding pass based on the sensed compressive force.

Controller 16 may be configured, in some embodiments, to control the winding tension during the final winding pass as a function of a radius of the tape wound about the hub to produce a substantially uniform elastic strain along the length of the tape. In other words, the winding profile applied by controller 16 may be selected to produce a substantially uniform elastic strain to avoid wide variation in strain along the length of tape 30, and thereby reduce the risk of deformation of the tape.

Figure 3:
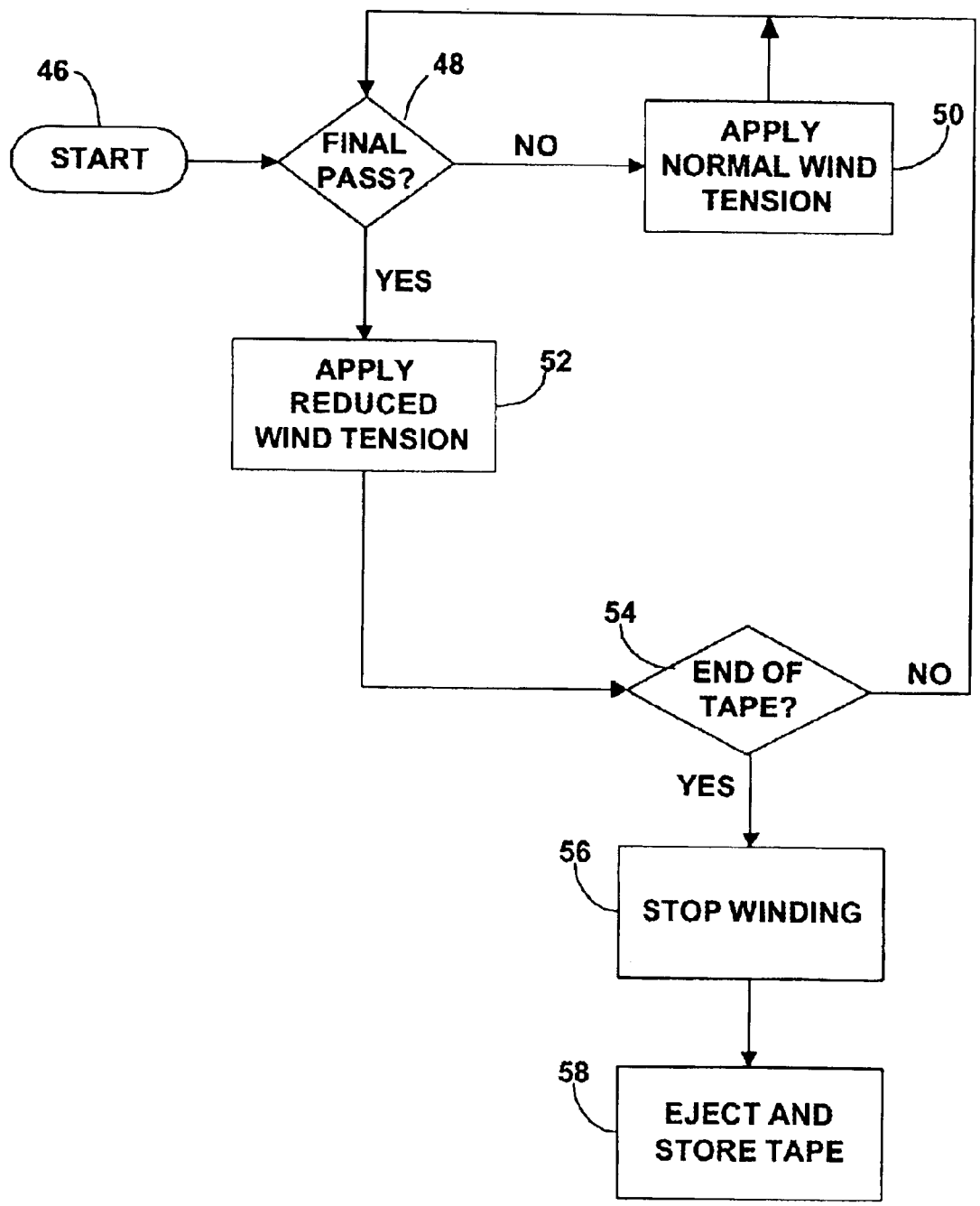
FIG. 3 is a flow diagram illustrating a technique for reducing tape deformation in a tape cartridge.

FIG. 3 is a flow diagram illustrating a technique for reducing tape deformation in a data tape cartridge. As shown in FIG. 3, at the start (46) of the process, controller 16 determines whether the present winding operation is the final winding pass (48) or an ordinary winding operation to address portions of tape 30 for data read-write operations.

Controller 16 may determine that the winding operation is a final winding pass, for example, in response to a signal from host computer 12 received via interface 14, especially in a library setting, or in response to a signal generated within drive 10, e.g., in response to depression of an ejection button in a stand-alone tape drive.

If the present winding operation is not a final winding pass, controller 16 controls motors 18, 20 to apply a normal winding tension to tape 30 and thereby bring the tape to a desired position relative to head 36. The winding operation may continue at normal winding tension in response to addressing instructions associated with read/write operations.

If a final winding pass is detected (48), however, controller 16 controls motors 18, 20 to apply a reduced winding tension that is less than the normal winding tension (52). In this manner, drive 10 is capable of reducing the strain applied to tape 30 following unloading and during prolonged storage of cartridge 26. The final winding pass continues at reduced tension until the end of the tape is reached (54), at which time winding can be stopped (56) and tape cartridge 26 can be ejected from tape drive 10 and stored (58). In particular, tape cartridge 26 can be stored with a reduced winding tension and, consequently, reduced strain and compression.

Figure 4:
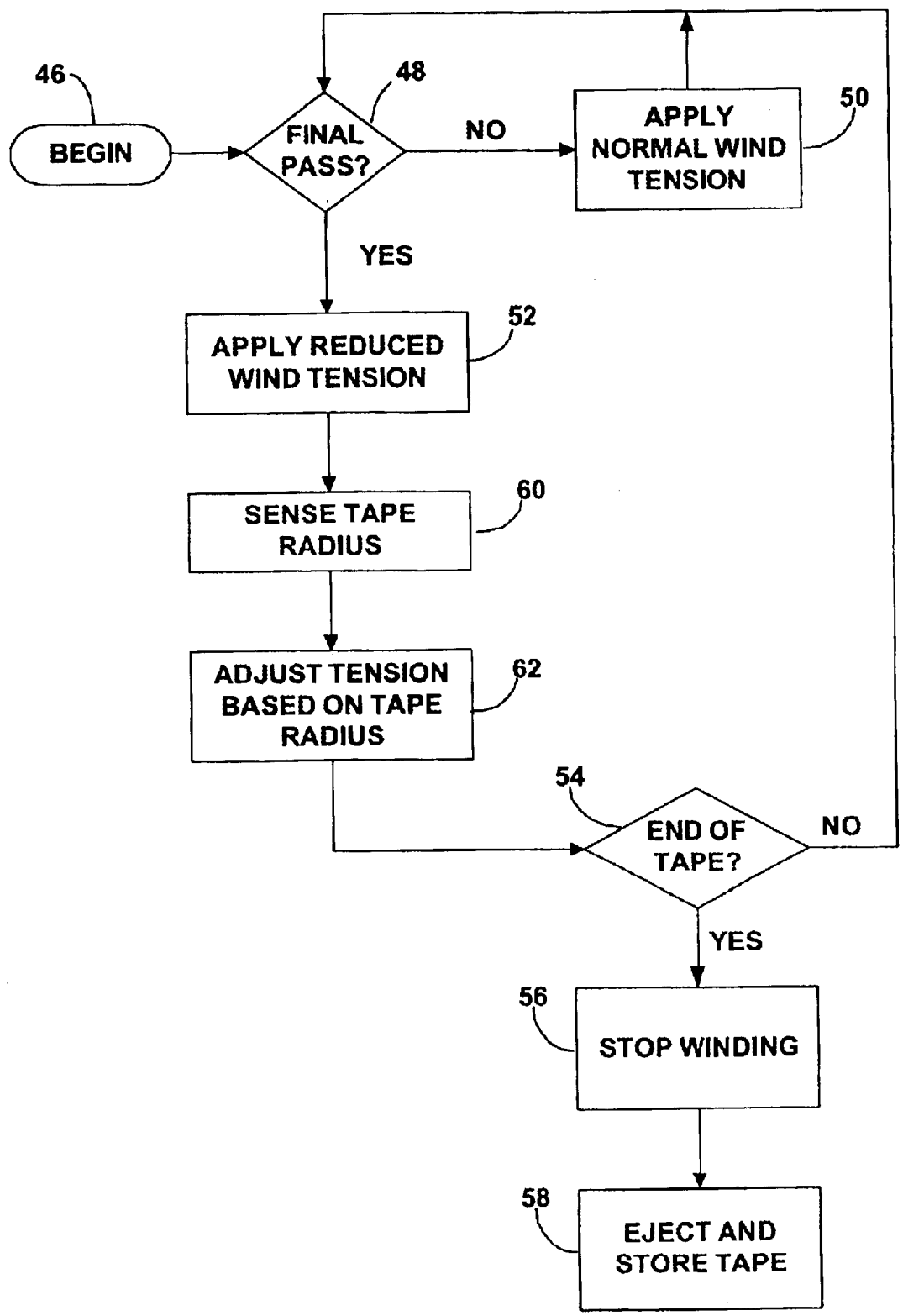
FIG. 4 is a flow diagram illustrating another technique for reducing tape deformation in a tape cartridge.

FIG. 4 is a flow diagram illustrating another technique for reducing tape deformation in a tape cartridge. FIG. 4 is similar to FIG. 3 with the following exception. In addition to applying a reduced winding tension (52) during the final pass, controller 16 may be configured to sense the tape radius (60) via one or more sensors 22 and adjust the winding tension in response to the sensed tape radius (62). In this manner, controller 16 may apply a profiled winding tension that varies according to the radius of the tape on cartridge hub 44.

Sensors 22 sense the radius of the tape 30 wound about a hub, and pass that information to controller 16. Again, the radius may be sensed directly or on the basis of the length of tape 30 wound about one of hubs 32, 44. Based on the sensed radius, controller 16 calculates speeds at which the two motors 18, 20 must operate in order to achieve the desired winding tension. If sensors 22 are configured to detect the length of tape 10 wound about a hub 32, 44, controller 16 may also calculate the radius of tape wound about the hub.

Sensors 22 may be realized by a variety of different sensing mechanisms. To sense radius, for example, sensor 22 may be configured as an optical sensor that optically detects the radius of tape 30 about a hub 32, 44 or changes in the radius. To sense the length of tape 30 wound about a hub 32, 44, sensor 22 takes the form of an optical sensor or magnetic sensor that detects features on the surface of tape 30 to monitor travel of the tape in one direction or the other. Alternatively, the length of tape 30 may be sensed on the basis of servo tracking information or other addressing information utilized by controller 16 in winding and addressing the tape. Such information may be read from tape 30 by head 36 or other servo reader hardware.

Figure 5:
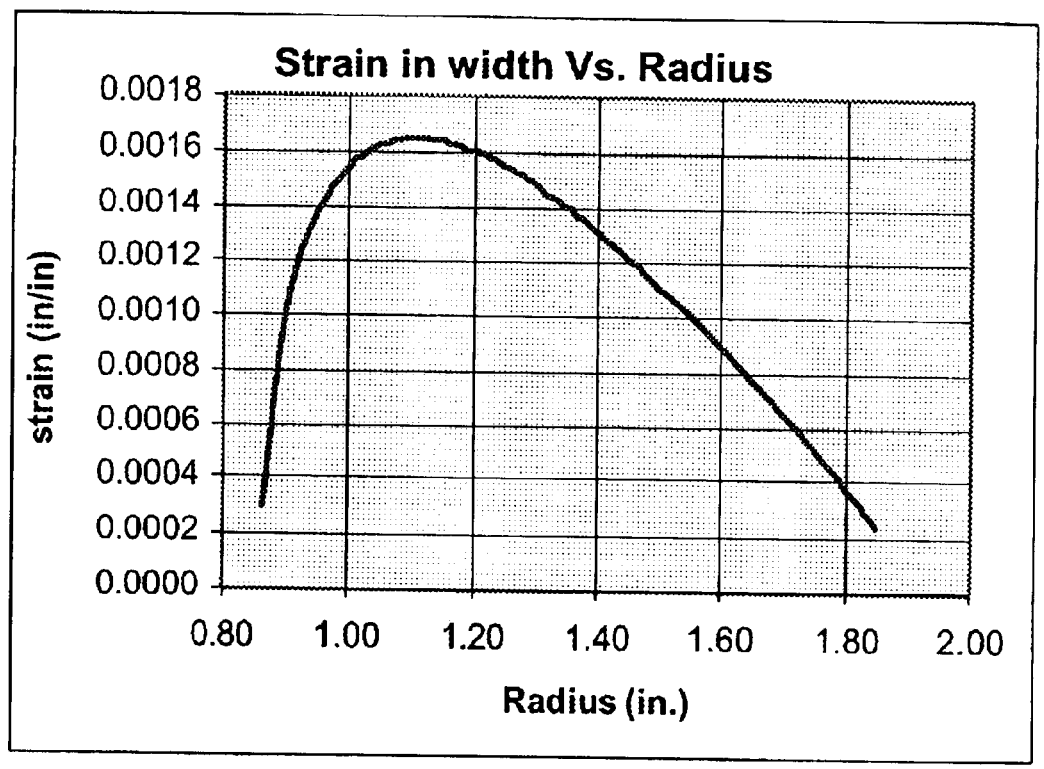
FIG. 5 is a graph illustrating strain in width versus radius of a tape wound about a hub when the tape is wound with a normal winding tension.

FIG. 5 is a graph illustrating strain in width versus radius of a tape wound about a hub when the tape is wound with a normal winding tension. In particular, the graph of FIG. 5 represents the strain in width versus tape radius for a standard Ultrium data tape cartridge upon final pass winding with a winding tension of approximately 3.6 ounces.

In general, the strain can be computed according to an adaptation of the model proposed by Hakiel to compute pack stresses in a wound roll based on tension, hub geometry, and tape properties. The model is described in Z. Hakiel, "Nonlinear Model for Wound Roll Stresses," Journal of the Technical Association of Paper and Pulp Industry, Vol. 70, pages 113–117, 1987. However, the graph further depicts consideration of elastic strain in the transverse, i.e., widthwise, direction of the tape.

Using this model, the graph of FIG. 5 shows the widthwise elastic strain as computed according to an adaptation of the Hakiel model for the standard Ultrium cartridge. As shown in FIG. 5, strain in the width direction of the tape can be substantially greater at the inner radii of the tape, and can potentially cause deformation and dimensional instability of the tape.

Figure 6:
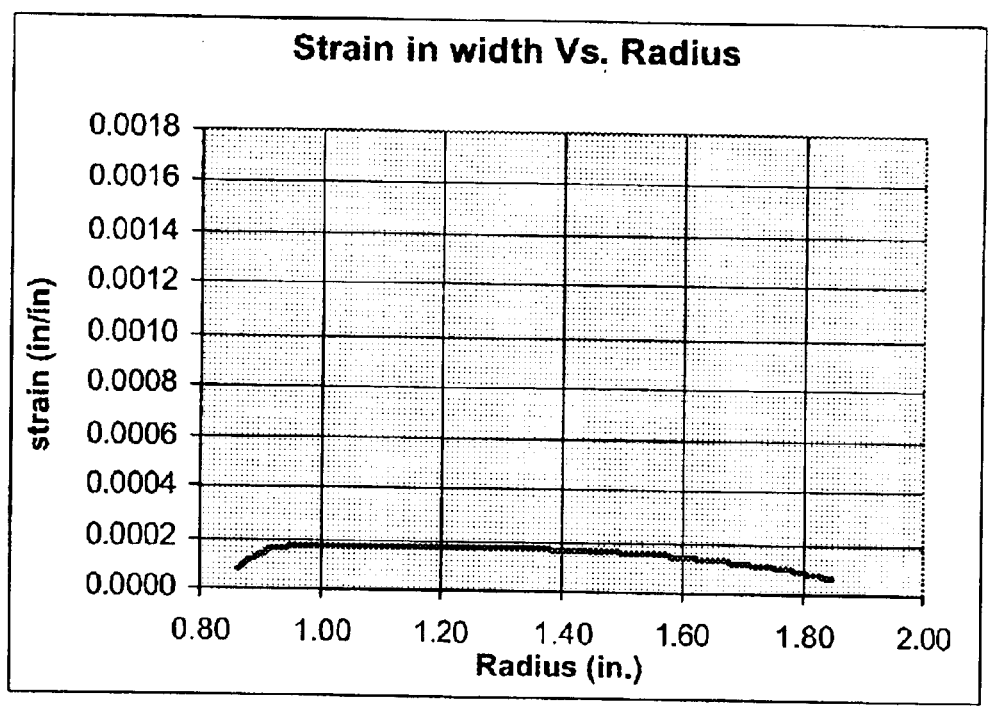
FIG. 6 is a graph illustrating strain in width versus radius of a tape wound about a hub when the tape is wound with a reduced winding tension.

FIG. 6 is a graph illustrating strain in width versus radius of a tape wound about a hub when the tape is wound with a reduced winding tension, in accordance with the invention. In the example of FIG. 6, tape in a standard Ultrium tape cartridge is wound in the final pass with a reduced winding tension of approximately 1 ounce.

Figure 7:
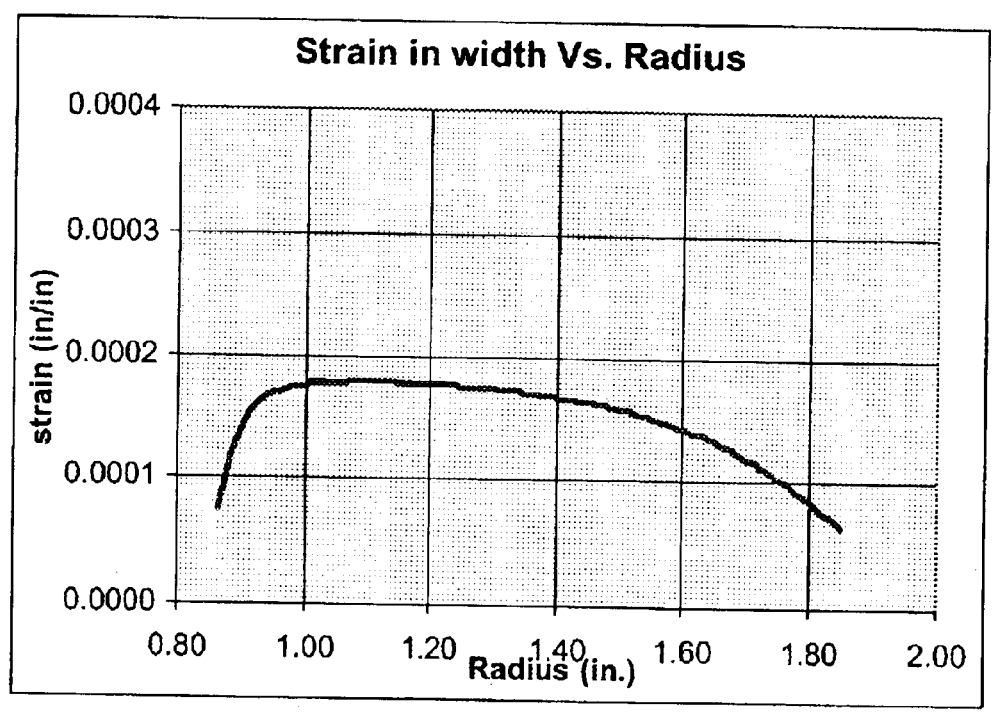
FIG. 7 is a graph illustrating an enlarged view of the graph of FIG. 6.

As shown in FIG. 6, reduction of the winding tension from approximately 3.6 ounces to approximately 1 ounce in the final winding pass results in reduction of the width-wise strain in the tape pack by almost an order of magnitude, i.e., from a peak width-wise strain of approximately 0.0016 inches/inch in FIG. 5 to a peak width-wise strain of approximately 0.0002 inches/inch in FIG. 6. Moreover, the widthwise strain is generally more uniform across different radial dimensions of the tape pack. FIG. 7 is a graph illustrating an enlarged view of the graph of FIG. 6.

Figure 8:
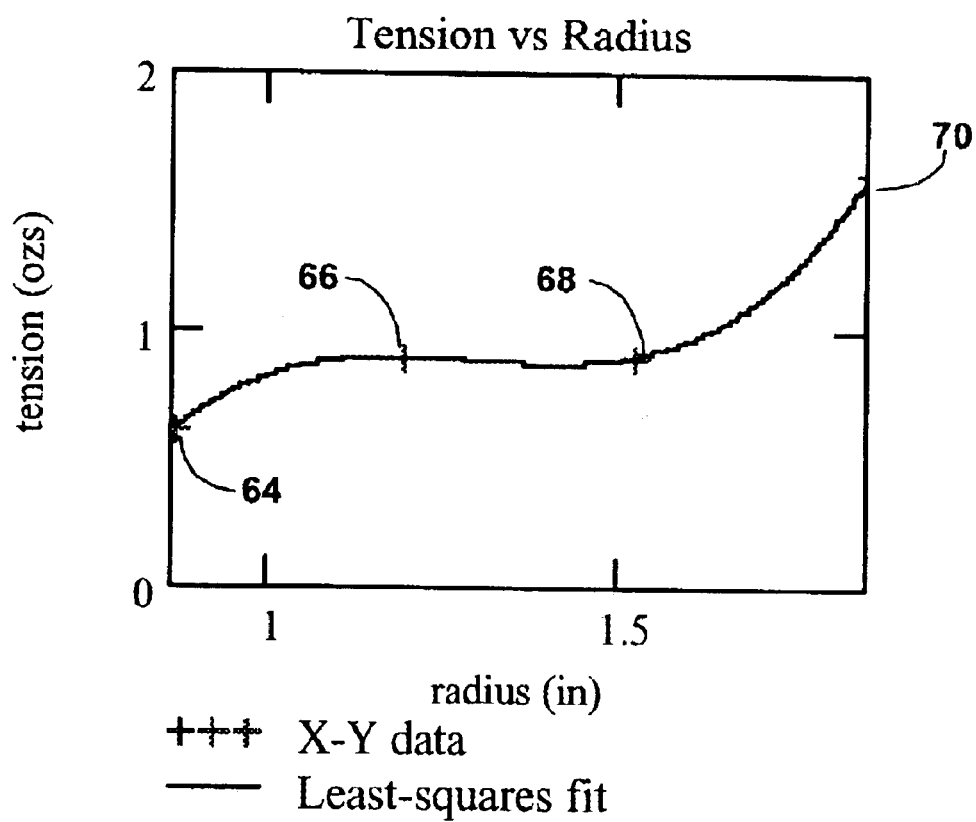
FIG. 8 is a graph illustrating a winding tension profile that can be applied as the radius of tape wound about a hub changes.

FIG. 8 is a graph illustrating a winding tension profile that can be applied as the radius of tape wound about a hub changes. FIG. 8 depicts winding tension applied at different radii of a tape pack. The radius is shown in inches. The winding tension is shown in ounces. In accordance with the invention, it is possible to profile, i.e., adjust, the winding tension during the final winding pass so that the resulting width-wise elastic strain is substantially uniform as a function of tape pack radius.

Figure 9:
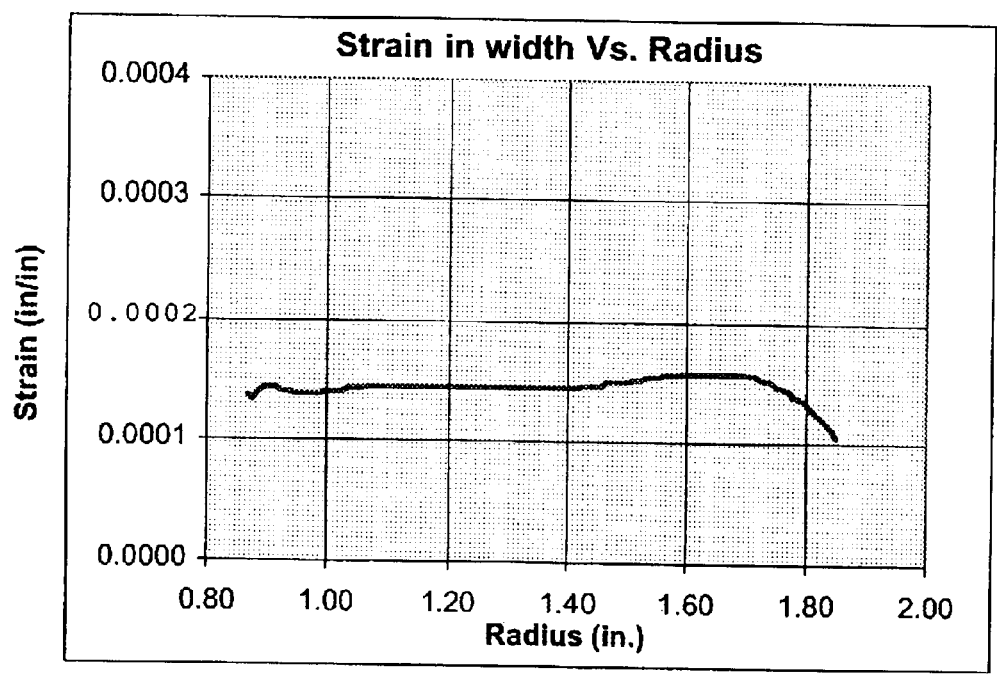
FIG. 9 is a graph illustrating strain in width versus radius of a tape wound about a hub when the tape is wound with a profiled winding tension as shown in FIG. 8.

The graph of FIG. 8 shows a tension profile and the resultant more uniform width-wise elastic strain on the tape. In the modeling example of FIG. 8, only four points 64, 66, 68, 70 are chosen to profile the tension. With more points to profile the tension, the resulting elastic strain profile along the tape could be made essentially flat. In this example, an aluminum hub was modeled to eliminate the sharp change in stresses that can occur near the core of a less stiff plastic hub. FIG. 9 is a graph illustrating strain in width versus radius of a tape wound about a hub when the tape is wound with a profiled winding tension as shown in FIG. 8.

In light of the strain in width versus radius characteristics capable of achievement using techniques as described herein, some of the embodiments of the invention also contemplate a data tape cartridge having a tape that exhibits a peak strain across the tape pack of less than approximately 0.004 inches/inch and, more preferably, less than approximately 0.0002 inches/inch. A data tape cartridge exhibiting such characteristics may provide increased operational reliability and longevity.

The techniques described herein may be applied not only within a data storage tape cartridge drive, but also in a manufacturing environment. For example, upon manufacture of a tape cartridge, the tape pack may remain idle until put in use by an end user. Thus, winding tensions applied at the manufacturing stage may influence the strain endured by the tape prior to initial usage. For this reason, it may be desirable to apply a reduced winding tension, i.e., a winding tension less than an ordinary winding tension applied during read/write operations, when winding the tape onto a hub to load a tape pack into a tape cartridge. The winding tension may be, for example, in the range of approximately 0.5 ounces to less than approximately 3 ounces, preferably approximately 0.5 ounces to less than approximately 2 ounces, and more preferably less than or equal to approximately 1 ounce.

Various embodiments of the invention have been described. The embodiments may provide one or more advantages. For example, the techniques described herein may produce reduced stresses on a tape pack prior to storage of the data tape cartridge. In other words, by applying a reduced winding tension during a final winding pass prior to unloading the tape cartridge from a drive, the tape cartridge can be stored with a reduced tension, resulting in reduced strain and compression. In this manner, the tape may be less likely to undergo significant deformation during storage, promoting dimensional stability and operational longevity. These and other embodiments are within the scope of the following claims.

What is claimed is:

1. A method comprising:
    winding a tape about a hub in a data tape cartridge with a first winding tension during use of the data tape cartridge within a tape drive; and
    winding the tape about the hub with a second winding tension less than the first winding tension during a final winding pass prior to unloading the tape from the tape drive.

2. The method of claim 1, wherein the first winding tension is in a range of greater than or equal to approximately 3 ounces to approximately 5 ounces, and the second winding tension is in a range of approximately 0.5 ounces to less than approximately 3 ounces.

3. The method of claim 1, wherein the first winding tension is in a range of greater than or equal to approximately 3 ounces to approximately 5 ounces, and the second winding tension is in a range of approximately 0.5 ounces to less than or equal to approximately 2 ounces.

4. The method of claim 1, wherein the hub is formed from one of metal and plastic.

5. The method of claim 1, wherein the hub of the data tape cartridge is a single data tape cartridge hub.

6. The method of claim 1, wherein winding the tape about the hub in the data tape cartridge includes unwinding the tape from a hub in the tape drive.

7. The method of claim 1, wherein the tape is a magnetic tape.

8. The method of claim 1, wherein the tape is an optical tape.

9. A tape drive comprising:
    a motor that drives a hub in a data tape cartridge to wind a tape about the hub; and
    a controller that controls the motor to wind the tape about the hub with a first winding tension during use of the data tape cartridge within the tape drive, and with a second winding tension less than the first winding tension during a final winding pass prior to unloading the tape from the tape drive.

10. The tape drive of claim 9, wherein the motor unwinds the tape from a hub in the tape drive.

11. The tape drive of claim 9, wherein the first winding tension is in a range of greater than or equal to approximately 3 ounces to approximately 5 ounces, and the second winding tension is in a range of approximately 0.5 ounces to less than approximately 3 ounces.

12. The tape drive of claim 9, wherein the first winding tension is in a range of greater than or equal to approximately 3 ounces to approximately 5 ounces, and the second winding tension is in a range of approximately 0.5 ounces to less than approximately 2 ounces.

13. The tape drive of claim 9, wherein the tape is a magnetic tape.

14. The tape drive of claim 9, wherein the tape is a optical tape.

15. The tape drive of claim 9, wherein the hub of the data tape cartridge is a single data tape cartridge hub.

16. A data tape cartridge comprising a hub and tape wound about the hub, wherein the tape exhibits a first tension of less than approximately 3 ounces, and wherein the first tension is less than a second tension applied to the tape during use of the data tape cartridge within a tape drive.

17. The data tape cartridge of claim 16, wherein the tape exhibits a tension of less than or equal to approximately 2 ounces.

18. The data tape cartridge of claim 16, wherein the tape exhibits a tension of less than or equal to approximately 1 ounce.

* * * * *